Patented June 25, 1946

2,402,804

UNITED STATES PATENT OFFICE 2,402,804

TREATMENT OF HYDROCARBON OILS

Vladimir L. Chechot, Philadelphia, Pa., assignor to The Atlantic Refining Company, Philadelphia, Pa., a corporation of Pennsylvania No Drawing. Application April 28, 1942, Serial No. 440,845

8 Claims. (Cl. 196—147)

The present invention relates to a method of refining hydrocarbon oils, and particularly the refining of viscous hydrocarbon oils such as mineral white oils, light colored lubricating oils, turbine oils, and the like.

An object of this invention is the production of mineral white oils, particularly medicinal white oils having a low carbonizable value and highly stable against the formation of undesirable oxygenated compounds, including acidic bodies and peroxides. The carbonizable content is determined in accordance with the U. S. Pharmacopeia test for carbonizable substances in liquid petrolatum, while peroxides are determined in accordance with the procedure set forth in an article entitled the "Evaluation of a deterioration factor in liquid petrolatum," published by Burrin, Whorton, and Bibbins in the Journal of the American Pharmaceutical Association, vol. 25, pages 27–31 (1936). Such peroxide test is commonly known as the "Eli Lily test."

Heretofore it has been common practice in the manufacture of medicinal white oils to subject a suitable oil stock to treatment with fuming sulfuric acid, such acid being applied in a series of dumps, with removal of acid sludge after each dump. The acid treated oil was then neutralized with an alkaline reagent, such as caustic soda solution, and the neutralized oil was extracted with dilute alcohol to remove alkali sulfonates. The oil, after extraction, was then water washed, dried by air blowing, and filtered through a decolorizing adsorbent such as fuller's earth or bauxite at ordinary or elevated temperature. The white oil so produced generally amounted to about 25 to 30 barrels per ton of earth, and had a carbonizable value of 40 to 100, and a peroxide value (Eli Lily) of 3 to 5. The yields thus obtained were not particularly satisfactory, and while such oils would meet the usual specifications, they would not satisfy the more stringent requirements currently promulgated by the marketers of medicinal oils, particularly with respect to stability against peroxide formation.

I have found that improved oils, particularly mineral white oils of high stability, may be produced by modifying the refining treatment heretofore employed in the manufacture of such oils.

In accordance with my invention, I have found that mineral white oils having a carbonizable value below 40, and preferably below 20, and a peroxide value (Eli Lily) of the order of 1 to 2, may be produced by a two-stage treatment of the acid refined oil with a decolorizing adsorbent, each stage of such treatment being carried out at a different temperature. Decolorizing adsorbents such as fuller's earth, natural or synthetic silicates, particularly magnesium silicate "Magnesol," bauxite, activated clay, and the like may be employed either in granular form or in finely divided form. Depending upon the degree of refinement of the oil stock to be decolorized, different quantities of the adsorbents may be used, although quantities of the order of ¼ to ¾ pound of adsorbent per gallon of oil have been found satisfactory. When using finely divided adsorbents such as fuller's earth fines or "Magnesol" having a particle size smaller than 100 mesh, the first stage adsorbent treatment is carried out at temperatures between 220° F. and 270° F., and preferably at temperatures within the range of 230° F. to 260° F. The second stage treatment is carried out at temperatures lower than those employed in the first stage, i. e., between 180° F. and 220° F., and preferably between 200° F. and 210° F.

However, when using granular decolorizing adsorbents, for example, 30/60 mesh fuller's earth, the temperatures employed are somewhat different than in the case of the finely divided adsorbents. The first stage treatment with the granular adsorbents is carried out at temperatures between 180° F. and 260° F., and preferably between 210° F. and 230° F., while the second stage treatment is carried out at temperatures between 80° F. and 150° F.

The used adsorbent from the second stage or lower temperature treatment may subsequently be employed, if desired, in a first stage or higher temperature treatment, thereby effecting the most economical and efficient use of the adsorbent. When utilizing finely divided adsorbents, i. e., finer than 100 mesh, and preferably finer than 200 mesh, such adsorbent may be thoroughly admixed or contacted with the oil for a suitable period, for example, 10 to 30 minutes, and thereafter separated from the treated oil by decantation or filter pressing. On the other hand, when using granular adsorbents, i. e., coarser than 80 mesh, the oil may be percolated or filtered through a bed of the adsorbent, the time of contact in the bed being more or less the same as that mentioned in connection with the finely divided adsorbents.

In carrying out the decolorization of acid treated oils, and particularly mineral white oils with adsorbents, I have found that either a single stage or a double stage treatment with the adsorbent at ordinary temperatures does not produce a finished oil of high stability against peroxide formation. Oils thus processed generally have a peroxide value (Eli Lily) of 3 to 5. Oils that have been subjected either to single stage or double stage treatment with the adsorbent at elevated temperatures, for example, 200° F. to 300° F., likewise are unsatisfactory from the standpoint of peroxide formation. Furthermore, oils which have been treated with the adsorbent at ordinary temperatures in the first stage, and at elevated temperatures in the second stage are also unsatisfactory in this respect. However, by applying the adsorbent first at elevated temperature, and then at a lower temperature, oils are produced which are highly stable against the formation of peroxides. The first treatment at elevated temperature promotes the formation of oxygenated compounds, particularly peroxides, and the second treatment at lower temperature effects removal of these undesirable compounds, the temperature in the second treatment being sufficiently low as not to promote the formation of peroxides. While the reason for such behavior is unknown, it appears that the first stage treatment with the adsorbent at elevated temperatures, for example, 240° F. to 270° F., catalytically accelerates the formation of peroxides and polymerized materials, and that such substances are removed by the second stage adsorbent treatment at a temperature below that at which such catalytic action takes place. Broadly speaking, therefore, my invention comprehends the treatment of oils with an adsorbent first at elevated temperatures conducive to the formation of peroxides, and then with an adsorbent at lower temperatures such that the peroxides or peroxide-forming substances may be readily removed.

In accordance with my invention, a viscous hydrocarbon oil stock is subjected to acid treatment, preferably with a plurality of dumps of fuming sulfuric acid, following which the oil is further treated with at least one dump of 98 per cent sulfuric acid at an elevated temperature of the order of 180° to 200° F. For example, the oil stock may be treated with 9 successive dumps of fuming sulfuric acid at ordinary temperatures, each dump amounting to 5 per cent by volume of the oil charged. The treated oil then is contacted with an additional 5 per cent dump of 98 per cent sulfuric acid at 180° F., and the resultant sludge removed. If desired, the last treatment at elevated temperature may be dispensed with, provided that one or more additional dumps of fuming sulfuric acid is employed in lieu thereof. The acid treated oil, substantially free of sludge, is then neutralized with caustic soda solution, and the resulting products of neutralization are removed by decantation. The neutralized oil is then extracted with dilute alcohol, for example, 50 per cent isopropyl alcohol and 50 per cent water, to remove from the oil those alkali sulfonates remaining in solution in the oil. The extracted oil is washed with water, dried by air blowing, and is then in condition for the two-stage adsorbent treatment.

The oil, as above processed, is thoroughly contacted with a finely divided decolorizing adsorbent, for example, ½ pound of fuller's earth fines per gallon of oil, at a temperature of 240° F. to 260° F. for about 20 minutes. The used earth is then filtered from the oil, and the oil is again contacted with fresh fuller's earth fines in the same ratio as before, but at a temperature of the order of 210° F. to 220° F. for approximately 20 minutes. The used earth then is removed from the treated oil, and may be reused in the first stage treatment of additional quantities of oil. The finished oil is obtained in a yield of about 30 to 40 barrels per ton of earth, and has a carbonizable value between 20 and 30, and a peroxide value of 1 to 2.

Substantially equivalent results may be obtained by using a two-stage treatment with a granular decolorizing adsorbent, such as #1 fuller's earth of 30/60 mesh, the first stage treatment being conducted at a temperature of 210° F. to 230° F., and the second stage at 80° F. to 150° F.

Additional examples of the invention follow. A hydrocarbon oil having a Saybolt Universal viscosity of 340 seconds at 100° F., refined by fuming acid treatment, neutralization, alcohol extraction, washing and drying, was treated with a synthetic magnesium silicate commercially known as "Magnesol," and with fuller's earth fines ("XXF clay"), and with 30/60 mesh fuller's earth, respectively. The conditions of the adsorbent treatment and the results obtained are given in the following table.

| Adsorbent | Treatment | | | | | | Refined oil | |
| --- | --- | --- | --- | --- | --- | --- | --- | --- |
| | 1st stage | | | 2nd stage | | | Carbonizable value | Peroxide value |
| | Lbs./gal. | T., °F. | Time, min. | Lbs./gal. | T., °F. | Time, min. | | |
| XXF clay | 0.5 | 250 | 20 | 0.5 | 220 | 20 | 20 | 1 |
| "Magnesol" | 0.25 | 260 | 20 | 0.25 | 220 | 20 | 30 | 2 |
| Do | 0.5 | 260 | 20 | 0.5 | 220 | 20 | 20 | 1 |
| 30/60 mesh fuller's earth | 0.75 | 210 | 20 | 0.75 | 80 | 20 | 20 | 1 |

While, herein, I have described my process particularly in its application to the refining of mineral white oils, it is to be understood that such process is also applicable to the treatment of other viscous hydrocarbon oils, such as lubricating oils, insulating oils, oils produced by selective solvent treatment, and the like.

I claim:

1. The method of refining hydrocarbon oil, which comprises contacting the oil with a finely divided decolorizing metal silicate adsorbent at a temperature between 230° F. and 260° F., and thereafter contacting the oil with an additional quantity of said finely divided adsorbent at a temperature between 180° F. and 220° F.

2. The method of refining hydrocarbon oil which has an acid treated, neutralized, and substantially freed of neutralization products, which comprises contacting the oil with a finely divided decolorizing metal silicate adsorbent at a temperature between 230° F. and 260° F., and thereafter contacting the oil with an additional quantity of said finely divided adsorbent at a temperature between 180° F. and 220° F.

3. The method of refining hydrocarbon oil, which comprises percolating the oil through a granular decolorizing metal silicate adsorbent at a temperature between 180° F. and 260° F., and thereafter percolating the oil through an additional quantity of said granular adsorbent at a temperature between 80° F. and 150° F.

4. The method of refining hydrocarbon oil, which comprises percolating the oil through a granular decolorizing metal silicate adsorbent at a temperature between 180° F. and 260° F., thereafter percolating the treated oil through an additional quantity of said granular adsorbent at a temperature between 80° F. and 150° F., and percolating untreated oil through said last mentioned adsorbent at a temperature between 180° F. and 260° F.

5. The method of refining hydrocarbon oil which has been acid treated, neutralized, and substantially freed of neutralization products, which comprises percolating the oil through a granular decolorizing metal silicate adsorbent at a temperature between 180° F. and 260° F., and thereafter percolating the oil through an additional quantity of said granular adsorbent at a temperature between 80° F. and 150° F.

6. The method of refining mineral white oil stock which has been acid treated, neutralized, and substantially freed of neutralization products, which comprises contacting the oil stock with a finely divided decolorizing metal silicate adsorbent at a temperature between 230° F. and 260° F., and thereafter contacting the oil stock with an additional quantity of said finely divided adsorbent at a temperature between 180° F. and 220° F.

7. The method of refining mineral white oil stock which has been acid treated, neutralized, and substantially freed of neutralization products, which comprises percolating the oil stock through a granular decolorizing metal silicate adsorbent at a temperature between 180° F. and 260° F., and thereafter percolating the oil stock through an additional quantity of said granular adsorbent at a temperature between 80° F. and 150° F.

8. In a two-stage method for refining hydrocarbon oil with a decolorizing metal silicate adsorbent wherein the oil is first contacted with said adsorbent at a temperature between 230° F. and 260° F. to promote the formation of oxygenated compounds and is thereafter contacted with fresh metal silicate adsorbent at a temperature between 180° F. and 220° F. to remove the oxygenated compounds without promoting the formation of additional quantities thereof, the step which comprises using in the first contacting operation partially spent adsorbent from the second contacting operation.

VLADIMIR L. CHECHOT.